(12) United States Patent
Ryu

(10) Patent No.: US 9,256,339 B2
(45) Date of Patent: Feb. 9, 2016

(54) TABLET HAVING A FLEXIBLE AND TRANSPARENT SENSING AREA

(71) Applicant: THE HAN INC., Seoul (KR)

(72) Inventor: Young Kee Ryu, Cheonan-si (KR)

(73) Assignee: THE HAN INC. (KR)

( * ) Notice: Subject to any disclaimer, the term of this patent is extended or adjusted under 35 U.S.C. 154(b) by 15 days.

(21) Appl. No.: 14/379,748

(22) PCT Filed: Feb. 20, 2013

(86) PCT No.: PCT/KR2013/001330
§ 371 (c)(1),
(2) Date: Aug. 19, 2014

(87) PCT Pub. No.: WO2013/125847
PCT Pub. Date: Aug. 29, 2013

(65) Prior Publication Data
US 2015/0009623 A1 Jan. 8, 2015

(30) Foreign Application Priority Data

Feb. 20, 2012 (KR) .................. 10-2012-0016881

(51) Int. Cl.
*G06F 3/046* (2006.01)
*G06F 1/16* (2006.01)
*H01Q 7/00* (2006.01)

(52) U.S. Cl.
CPC .............. *G06F 3/046* (2013.01); *G06F 1/1633* (2013.01); *H01Q 7/00* (2013.01); *G06F 2203/04102* (2013.01)

(58) Field of Classification Search
CPC .......... G06F 3/046; G06F 2203/04102; G06F 1/1633; H01Q 7/00

USPC .................... 345/173–178; 178/18.01–18.11; 361/679.55
See application file for complete search history.

(56) References Cited

U.S. PATENT DOCUMENTS

| 6,400,359 | B1 * | 6/2002 | Katabami | ............... | G06F 3/044 345/173 |
| 2006/0012581 | A1 * | 1/2006 | Haim | ..................... | G06F 3/046 345/173 |

(Continued)

FOREIGN PATENT DOCUMENTS

| KR | 20090123647 | 12/2009 |
| KR | 20110057384 | 6/2011 |

(Continued)

*Primary Examiner* — Dmitriy Bolotin
(74) *Attorney, Agent, or Firm* — Renaissance IP Law Group LLP

(57) ABSTRACT

The present invention relates to a tablet having a flexible and transparent sensing area, comprising: an insulating transparent base material having a first loop antenna and a plurality of comb-shaped first line antennas; and a control substrate having, mounted thereon, a first multiplexer (MUX) for selecting one of the ends of the plurality of first line antennas, an amplifier for outputting a potential difference between an output of the first multiplexer and the first loop antenna, and an MCU (micro controller unit) for generating a first selection signal and, on the basis of the potential difference from the amplifier, sensing the position of an electronic pen from one line antenna. The first loop antenna formed on the transparent base material is combined with a first conductive pattern formed on the control substrate, thereby forming a closed loop. Each of the plurality of first line antennas is connected to each of a plurality of first extending patterns insulatively crossing the first conductive pattern on the control substrate. The plurality of first extending patterns are connected to an input of the first multiplexer.

10 Claims, 6 Drawing Sheets

(56) References Cited

U.S. PATENT DOCUMENTS

| | | | |
|---|---|---|---|
| 2009/0167699 A1* | 7/2009 | Rosenblatt | G06F 3/044 345/173 |
| 2010/0207893 A1 | 8/2010 | Yeh et al. | |
| 2013/0016065 A1* | 1/2013 | Reynolds | G06F 3/0412 345/174 |
| 2013/0157690 A1* | 6/2013 | Lefevre | H04B 5/00 455/456.1 |
| 2014/0092051 A1* | 4/2014 | Weinerth | G06F 3/044 345/174 |
| 2014/0111474 A1* | 4/2014 | Bytheway | G06F 3/044 345/174 |
| 2015/0116091 A1* | 4/2015 | Lefevre | G06K 19/0723 340/10.3 |

FOREIGN PATENT DOCUMENTS

| | | |
|---|---|---|
| KR | 20110057385 | 6/2011 |
| KR | 20110136953 | 12/2011 |

* cited by examiner

Electronic pen sensing region | Driver circuit (a)

(b)

(c)

TABLET HAVING A FLEXIBLE AND TRANSPARENT SENSING AREA

TECHNICAL FIELD

The present invention relates to a tablet having a flexible and transparent sensing region, and more particularly, to a tablet configured to be capable of sensing a contact of an electronic pen on the surface of a flexible and transparent film.

BACKGROUND ART

Recently, there has been the spotlight on electronic devices (tablet operating systems) which are able to be handled by touching a display surface with a finger or an electronic pen, like a smart phone and a tablet computer.

Further, in tablet operating systems, a predetermined electronic pen sensing region should be set up so as to handle an electronic device by using an electronic pen. A position of the electronic pen which touches the sensing region should be calculated, for example in orthogonal coordinates.

One example of such tablet operating systems is disclosed in Korean patent application publication No. 2008-86829 (hereinafter, referred to as the reference document). In the reference document, loop coils for sensing a position of an electronic pen with respect to any one of axis directions are arranged in an overlapping structure in which at least three loop coils are insulated from each other. Thus, at the time of configuring a position detecting region having a loop coil pattern, a laminate structure of at least six layers is required even when configuring the position detecting area using a transparent conductive material such as ITO, etc., and a transparent insulating sheet. Therefore there is a limitation on transparency. Further, flexibility of the position detecting area itself is reduced with overlapping of a multi-layered sheet.

In addition, in order for the respective loop coils to be insulated from each other and for the ends thereof to be connected together, a vertical structure such as a through hole which passes through insulation layers is required. Therefore it was difficult to form such a vertical structure with transparent insulation sheets so that in the prior art there was no choice but to use opaque, thick and hard sheets. In this way, a tablet in the prior art in which the substrate of an opaque and fixed type is used as an electronic pen sensing region has a limitation on usage methods and applications of the tablet.

DETAILED DESCRIPTION OF THE INVENTIVE CONCEPT

Technical Problem

The object of the present invention is therefore to provide a tablet which can ensure transparency of an electronic pen sensing region which is used for detecting a touch position of an electronic pen, to the maximum. Another object of the invention is to provide for various applications of a tablet of a transparent and flexible material.

According to an aspect of the inventive concept, there is provided a tablet having a flexible and transparent sensing region includes a antenna substrate of an insulating material including a first loop antenna of a transparent conductive material pattern with an open one end thereof formed to enclose an external circumference of an electronic pen sensing region for detecting a position of the electronic pen; and a plurality of first line antennas of a transparent conductive material pattern which are arranged in parallel with each other within an internal portion of the electronic pen sensing region enclosed by the first loop antenna and ends of which are electrically connected to the first loop antenna to form a shape of comb teeth; and a control substrate including a first multiplexer (MUX) which has the other ends of the plurality of first line antennas, as inputs, and is configured to select any one of the inputs according to a first selection signal, as an output; an amplifier which is configured to output a potential difference between an output of the first multiplexer and an output of the first loop antenna; and a MCU (micro controller unit) which is configured to generate the first selection signal in any manner to select at least one of the plurality of first line antennas and then detect a position of the electronic pen outputting a resonant voltage of a predetermined frequency, from any one of the first line antennas on the basis of the potential difference outputted from the amplifier when the electronic pen approaches closely the electronic pen sensing region, wherein both ends of the first loop antenna formed on the antenna substrate are combined with a first conductive pattern formed on the control substrate to form a closed loop, the other ends of the plurality of first line antennas are respectively connected to a plurality of first extension patterns which are insulated from and intersected with the first conductive pattern on the control substrate, and the plurality of first extension patterns are connected with the input of the first multiplexer.

The antenna substrate may be formed of a transparent and flexible material.

A common potential may be connected to the first conductive pattern formed on the control substrate.

The pattern of the first loop antenna and the pattern of the first line antenna on the antenna substrate may be screen-printed by a transparent, conductive and flexible material.

The antenna substrate may further include a first transparent protective layer for insulating the pattern of the first loop antenna from the pattern of the plurality of first line antennas, a second loop antenna of a transparent and conductive material which is formed on the transparent protective layer and configured with an open one end thereof formed to enclose an external circumference of the electronic pen sensing region, and a plurality of second line antennas of a transparent and conductive material pattern which are arranged in parallel with each other within an internal portion of the second loop antenna and ends of which are connected to the second loop antenna to form a shape of comb teeth. The control substrate may further include a second conductive pattern which combines the pattern of the second loop antenna formed on the antenna substrate to form a closed loop, a plurality of second extension pattern which are connected to each of the second line antennas formed on the antenna substrate and are intersected with and insulated from the second conductive pattern, and a second multiplexer which has as inputs, the plurality of extension patterns and is configured to select as an output any one of the inputs according to a second selection signal and connect the selected output to the amplifier, wherein the MCU may be further generate a second selection signal for selecting any one of the plurality of second line antennas and may further detect a position of the electronic pen from any one of the second line antennas on the basis of a potential difference outputted from the amplifier.

The tablet having a flexible and transparent sensing region may further include a pattern of a power coil on the antenna substrate for enclosing the electronic pen sensing region.

The tablet having a flexible and transparent sensing region may further include a power coil control substrate which is formed of a flexible material and in which a pattern of a power coil is formed to enclose the electronic pen sensing region.

The tablet having a flexible and transparent sensing region may further include a power supply driver for supplying the power coil with an alternate current voltage via a resonant frequency of the electronic pen.

Advantageous Effects

According to a tablet having a flexible and transparent sensing region according to the invention, as an electronic pen sensing region is almost transparent and flexible, thereby being able to be freely twisted, the tablet according to the invention can be used for various applications such as an application of closely contacting the tablet with a curved surface, an application of using an underdrawing reflected in the electronic sensing region and an application of an application of applying the tablet on a display surface of a display device.

BRIEF DESCRIPTION OF THE DRAWINGS

Exemplary embodiments of the invention are illustrated in the drawing and will be described in more detail in the following description. In the drawing.

MODE OF THE INVENTIVE CONCEPT

First, the detecting principle of the electronic pen for use in the tablet according to the present invention, and the structure and the operation of the tablet having a flexible and transparent sensing area according to the present invention on the basis of this principle will be described.

Figure 1:
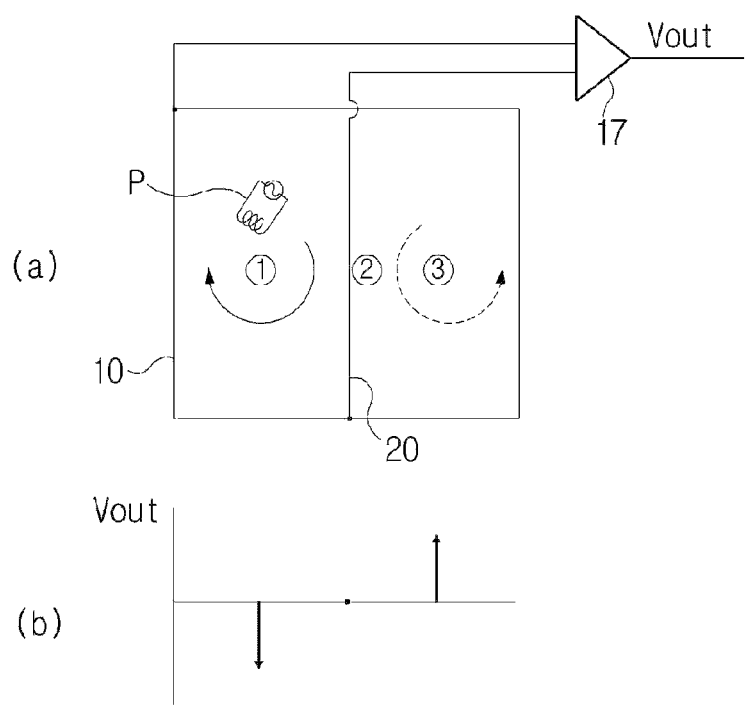
FIG. 1 is a drawing of explaining the basic principle of detecting a position of the electronic pen by means of a loop antenna and a line antenna.

FIG. 1 is a drawing for explaining a basic principle of detecting the position of the electronic pen having a resonant circuit utilizing a loop antenna and a line antenna. First, the structure of antennas for sensing the electronic pen (P) in the tablet by referring to FIG. 1(a) is described. In the drawing, the loop antenna 10 configured in a closed loop type is arranged, and a line antenna 20 is arranged to traverse the loop antenna 10 of a loop type, with one end of the line antenna 20 being connected to one side of the loop antenna 10. The other end of the line antenna 20 is connected to one input of an amplifier 17. The other input of the amplifier 17 is connected to the loop antenna 10. The amplifier 17, for example a differential amplifier outputs a potential difference Vout by amplifying the value obtained by subtracting a potential of the loop antenna 10 from a potential of the line antenna 20. In such antenna configuration, there occurs a point at which a pattern of the line antenna 20 crosses a pattern of the loop antenna 10. At this point the line antenna 20 and the loop antenna 10 have to be insulated from each other.

Meanwhile, FIG. 1(a) shows a state in which an electronic pen P comprising an inductor and an alternate current source is located at point ①. As an alternate current source pulses at the electronic pen P, electromagnetic force is generated from an inductor L. The line antenna 20 and the loop antenna 10 generate an induced current by an electromagnetic force generated from the electronic pen P.

FIG. 1(b) shows a potential difference Vout which is outputted from the amplifier 17 when the electronic pen P is located at point ①, point ② and point ③, along with an antenna structure shown in FIG. 1(a). First, when the electronic pen is located at point ① within a loop of the loop antenna 10 shown in FIG. 1(a), an induced current flowing in the direction of an arrow of a solid line is generated at line antennas 20. Meanwhile, the generated induced current induces a flow of the current in the form of a dotted line as well as a flow of the current in the form of a solid line. If such induced current is generated the amplifier 17 outputs a potential difference for example in the negative direction (in drawing, indicated by a downward arrow).

In addition, if an electronic pen is located at point ③, an induced current in an opposite direction to the previous direction is generated at the line antenna 20 and a positive potential difference is outputted at the amplifier 17.

Further, if the electronic pen P is located at point 2, i.e., directly on the line antenna 20, an induced current is counterbalanced each other at the line antenna 20, thereby no induced current occurs at the line antenna 20 and no potential difference occurs at the amplifier 17.

According to such antenna structure, within a loop of the loop antenna 10 it can be detected whether the electronic pen P is located in the right side or the left side of the line antenna or positioned on the line antenna.

In addition, by the magnitude of a potential difference Vout being outputted, the distance of between the electronic pen and the line antenna can also be determined.

Meanwhile, the above description is based on the assumption that the electromagnetic force which the electronic pen P outputs exhibits a constant direction.

However, in practice the direction of an electromagnetic force which an electronic pen P generates is changed according to pulsation of an alternate current source. Accordingly, a potential difference which is outputted from the amplifier 17 will also vibrate depending on a pulsation frequency of an alternate current source. The description about this point will follow later with reference to FIG. 2.

Figure 2:
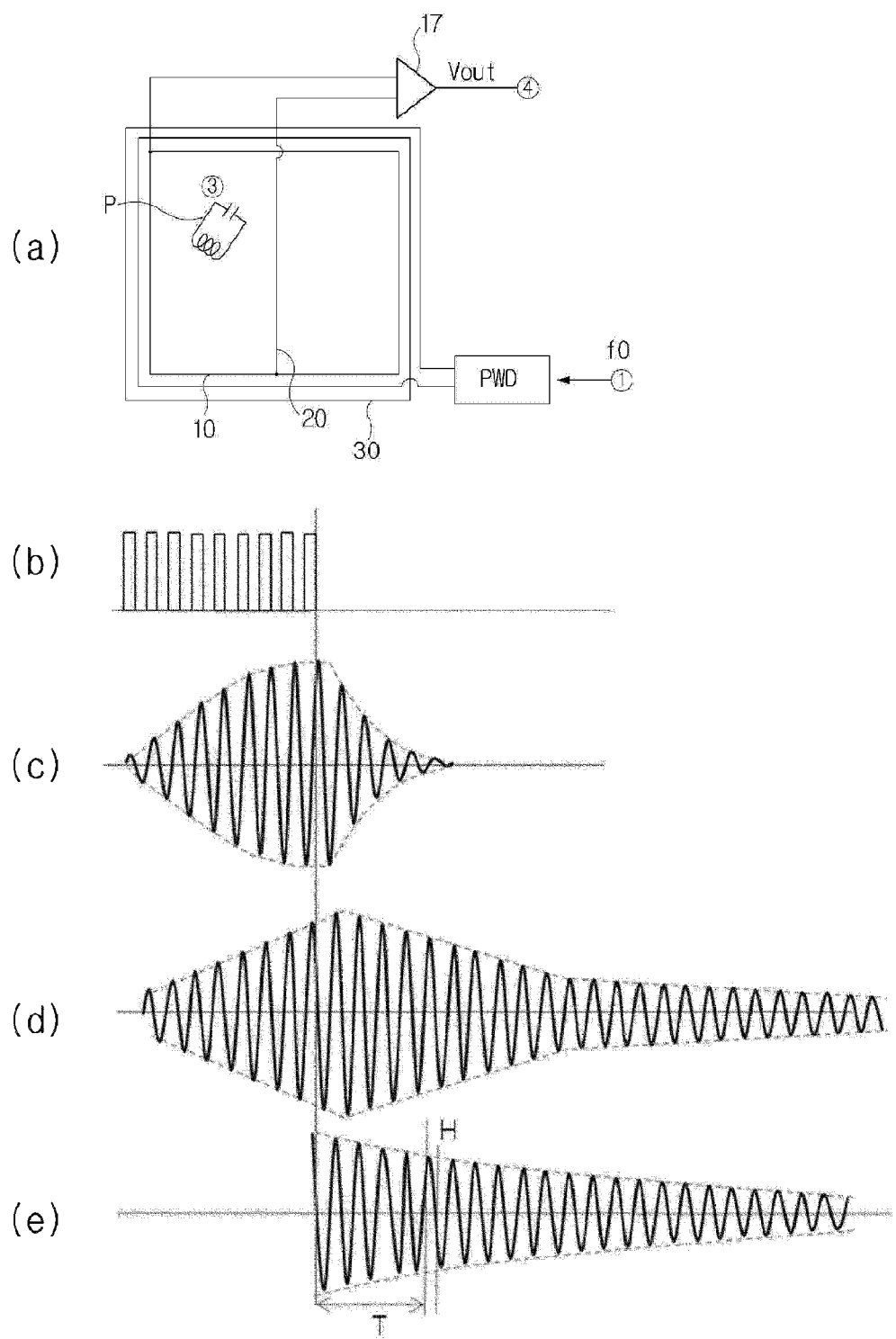
FIG. 2 illustrates the waveforms of voltages which the respective portions of a tablet having the structure comprising the line antenna and the loop antenna shown in FIG. 1 represent.

FIG. 2 illustrates the electronic pen and waveforms of voltages generated at the respective portions of the tablet at the time of the operation of the electronic pen and the tablet, in the structure comprising the line antenna and the loop antenna illustrated in FIG. 1 wherein the electronic pen is capable of operating by means of energy supplied wirelessly from the outside without use of a consumable power source such as a dry battery so as to drive a resonant circuit.

Referring to FIG. 2(a), a power coil 30 is arranged to enclose an external circumference of the loop antenna 10 wherein the power coil 30 is supplied with an alternate-current power from a power supply driver (PWD) 32 (refer to FIG. 5) and wherein the alternate-current power pulses at a resonant frequency f0 of a resonant circuit embedded in the electronic pen P.

At this time, the power coil 30 outputs an electromagnetic force by an electric power supplied from a power supply driver 32 and the resonant circuit of the electronic pen P generates an induced current by this electromagnetic force. The induced current generated by the electronic pen P charges energy as much as a capacity of the embedded resonant circuit (including at least an inductor and a capacitor). Then, even if power supply from the power supply driver 32 to the power coil 30 is stopped, the electronic pen P can still resonate for a certain period of time by energy charged into the resonant circuit.

Meanwhile, if the resonant circuit of the electronic pen P resonates in the state in which power supply to the power coil 30 is interrupted, the line antennas 20 at the side of the tablet generates an induced current as described in FIG. 1 and the amplifier 17 outputs a potential difference Vout between the line antenna and the loop antenna.

In this way, by both controlling the driving of the power coil by means of the power supply driver 32 and utilizing a potential difference outputted from the amplifier 17 in the interval in which an electric power is not supplied to the power coil 30 through the power supply driver 32, the position of the electronic pen P can be detected.

FIG. 2(b) is a voltage waveform measured at point ① which is a control signal for driving a power supply driver 32 (Here, an electric power of the control signal causes the power coil 30 to vibrate at a resonant frequency f0). At this time, by setting an interval of supplying an electric power of a resonant frequency and an interval of not supplying an electric power, it is possible to configure an interval of supplying an electronic pen with energy and an interval of detecting a position of an electronic pen by causing an electronic pen itself to resonate. Some rising pulses illustrated in the drawing are exemplary but in the practical embodiment the pulses can be configured to be from several 100 Hz to several MHz or more frequencies.

FIG. 2(c) is a voltage waveform generated at the power coil 30 wherein even if the power supply driver 32 supplies the power coil 30 with an electric power of a square wave signal of a resonant frequency, it can be noted that a voltage of a gradually rising sine wave form is generated at the power coil 30 by counter electromotive force phenomenon. At this time, the electromagnetic force will be outputted in the direction normal to the ground surface at the power coil 30. Further, as the power coil 30 does not have an element (for example, capacitance) constituting a resonant circuit together with the power coil, a voltage waveform is rapidly interrupted when electric power supply from the power supply driver 32 is interrupted.

FIG. 2(d) is a voltage waveform measured at point ③ which is a waveform of a voltage according to an induced current induced at a resonant circuit of an electronic pen P by an electromagnetic force output at a power coil 30. The resonant circuit of the electronic pen P is charged by the energy of its own capacity. Even if the output of electromagnetic force is interrupted at the power coil 30, the electronic pen P continues to resonate for a predetermined period of time due to energy charged into the resonant circuit.

FIG. 2(e) is a waveform of a potential difference wherein a current is induced at the line antenna 20 and the loop antenna 10 by a resonant circuit of the electronic pen which continues to resonate even after power supply from the power supply driver 32 is interrupted and by this induced current the potential difference is generated between the line antenna 20 and the loop antenna 10. That is to say, FIG. 2(e) is a waveform of a voltage measured at point ④, i.e., the amplifier 17. The position of the electronic pen P relative to the line antenna 20 is determined by sampling (H) a voltage at any point T from a waveform of a potential difference outputted at the amplifier 10 in this way (a voltage like in the type of FIG. 1(b) is obtained), and utilizing the sampled value.

Figure 3:
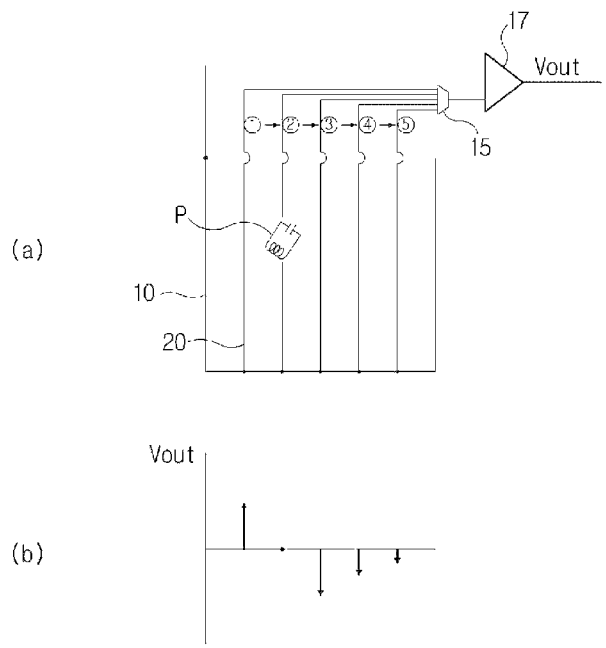
FIG. 3 is a drawing which describes the configuration and the operation capable of detecting the position of the electronic pen in more detail by means of a loop antenna and a plurality of line antennas.

FIG. 3 is a drawing for describing the structure and the operation which is capable of detecting more exactly the position of the electronic pen P by means of the loop antenna 10 and a plurality of line antennas 20. Here, one ends of the plurality of line antennas 20 are electrically connected to the loop antenna 10. The plurality of line antennas are parallel with each other and extend across one side of the loop antenna. The other ends of the plurality of line antennas respectively are connected to inputs of a multiplexer 15 to form a structure of the teeth shape of a comb. Line antennas 20 should not be connected to the loop antenna 10, except that one ends of line antennas are connected to the loop antenna 10. That is, the other ends of the line antennas 20 are insulated from the loop antenna 10.

Meanwhile, an output of the multiplexer 15 is connected to an input of the amplifier 17 and the multiplexer can select the other end of any one of line antennas according to a selection signal inputted from the outside, for example MCU. Please refer to FIG. 4 because FIG. 3 does not illustrate a power coil and a power supply driver.

In such antenna structure, for example in the state where the electronic pen P is located at the position illustrated in FIG. 3(a), if a plurality of line antennas 20 are sleeted sequentially from point ① to point ⑤ by controlling the multiplexer 15, potential differences Vout in the form of FIG. 3(b) can be obtained.

That is to say, for example if a line antenna ① is selected, a positive potential difference can be outputted in the amplifier 17 as the electronic pen P is located near the right side of the line antenna ①.

Then, if a line antenna ② is selected, no potential antenna is not outputted in the amplifier 17 because the electronic pen P is located on the line antenna ②.

Next, if a line antenna ③ is selected, a negative potential difference can be outputted in the amplifier 17 as the electronic pen P is located at the left side of the line antenna ③.

After that, if a line antenna ④ or ⑤ is selected, a negative potential difference can be outputted in the amplifier 17 as the electronic pen P is also located at the left side of the line antenna wherein as the line antenna ④ or ⑤ is relatively far from the electronic pen, a smaller potential difference in this case than in case the line antenna ③ is selected can be outputted.

If the potential differences are obtained at all line antennas in this way, a graph like FIG. 3(b) can be obtained. Thus, the position of the electronic pen P can be determined as a position where the magnitude of a potential difference is reversing, i.e., as a position of the line antenna ②. Meanwhile, even if the electronic pen is not on the line antennas but is between the line antennas, there occurs a phenomenon that a potential difference is reversing between antennas at both sides adjacent to the electronic pen and thereby there is no problem in determining a position of an electronic pen.

The operation of detecting a potential difference by selecting line antennas one by one in this way is referred to as 'scanning'. Meanwhile, a scanning can be carried out sequentially from the line antenna at one end to the line antenna at the opposite end as described above and can also be performed to more rapidly detect a position of an electronic pen by selecting a line antenna located at any position in various ways. In addition, when a position of an electronic pen is determined during the scanning of some of line antennas even if all line antennas are not yet scanned, the scanning of the remaining line antennas can also be ended.

Next, referring to FIG. 4, a structure of an electronic pen and a schematic structure of the tablet for detecting a position of the electronic pen will be described. First, referring to FIG. 4(a), a structure can be shown where the structure comprises a plurality of X axis line antennas 20X which are arranged along and parallel to X axis and a plurality of Y axis line antennas 20Y which are arranged along and parallel to Y axis. At this time, the respective X axis line antennas and the respective Y axis line antennas are insulated from each other. In this way, both a position of X axis and a position of Y axis of the electronic pen can be detected by means of X axis line antennas 20X and Y axis line antennas 20Y. As a result, two dimensional coordinates of the electronic pen can be produced.

At this time, a region including both X-axis line antennas 20X and Y-axis line antennas 20Y (the region is indicated in dotted lines) is an electronic pen sensing region A where a position of an electronic pen can be detected.

At the outside of the electronic pen sensing region A, a power coil 30 in the shape of enclosing X-axis line antennas 20X and Y-axis line antennas 20Y is arranged, thereby being able to supply the electronic pen with electromagnetic force.

One ends of X-axis line antennas 20X are connected to the loop antenna 10 and the other ends thereof are connected to the multiplexer 15 as an input thereof. An output of the multiplexer 15 is connected to one of inputs of an amplifier 17.

In addition, one ends of Y-axis line antennas 20Y are also connected to the loop antenna 10 and the other ends thereof are connected to an input of the multiplexer 25. An output of the multiplexer 25 is intended for an input of the amplifier 17.

Figure 4:
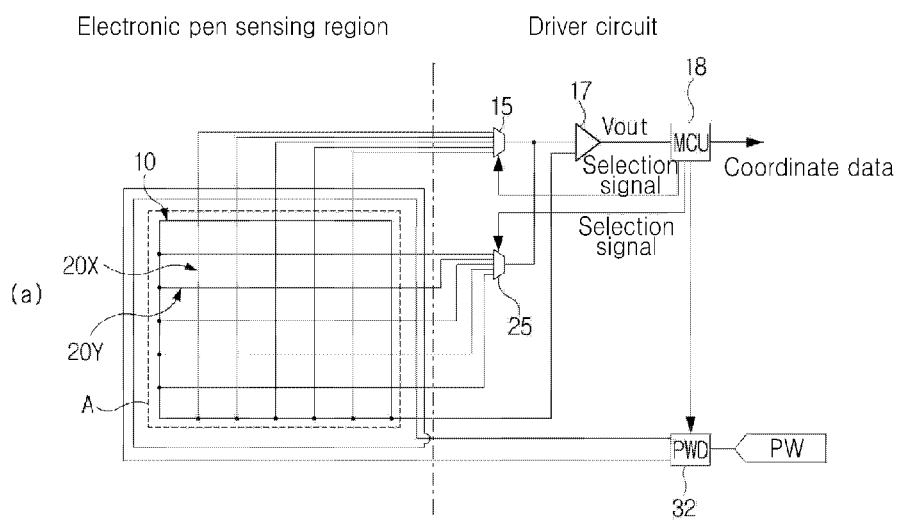
FIG. 4 shows the schematic configuration of a tablet for detecting the position of an electronic pen and the configuration of the electronic pen for use in the tablet.
Figure 4:
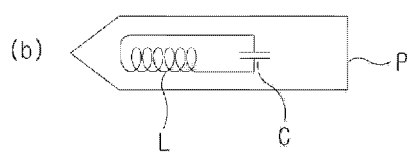

Herein, a loop antenna connected to X-axis line antennas and a loop antenna connected to Y-axis line antennas can be configured as one common loop antenna as shown in FIG. 4 but can also be configured as individual antennas.

Amplifier 17 receives outputs of multiplexers 15 and 25 and any one potential of loop antennas, as inputs (wherein loop antennas are maintained in the same potential), and the amplifier outputs a potential difference of both inputs. The outputted potential difference is inputted into a MCU (micro controller unit) 18.

MCU 18 transmits a selection signal to the multiplexers 15 and 25 to select the other end of any one of line antennas (i.e., any one of X-axis line antennas and Y-axis line antennas) and thereby a voltage from the other end selected thereof is applied to the amplifier 17. And MCU serves to control such that other line antennas are scanned by changing and sequentially outputting the selection signal and the position relation of an electronic pen relative to the selected line antenna is detected by receiving potential differences outputted from the amplifier 17 whenever any one of line antennas is selected. MCU produces coordinates of the electronic pen using a position relation detected when all or some line antennas are scanned.

In addition, MCU 18 can control the operation of a power supply driver 32 by generating a control signal according to a resonant frequency.

Next, FIG. 4(b) shows the schematic structure of the electronic pen according to the invention. The electronic pen P comprises a resonant circuit including at least inductor L and a capacitor C. When the resonant circuit is located within an electromagnetic field where an electromagnetic force is acted, resonance phenomenon occurs during charging and discharging of the capacitor C by an induced current generated at the inductor L. Such resonance phenomenon lasts during a predetermined period of time according to the time constant of the resonant circuit even after the electromagnetic force is removed.

In addition, circuit elements which operate according to an induced circuit generated can also be arranged in the electronic pen.

Hereinafter, with use of a tablet of the structure described above, there is provision of a method for being capable of implementing, inexpensively with an easier manufacturing method, a circuit pattern intended for configuring an electronic sensing region.

Figure 5:
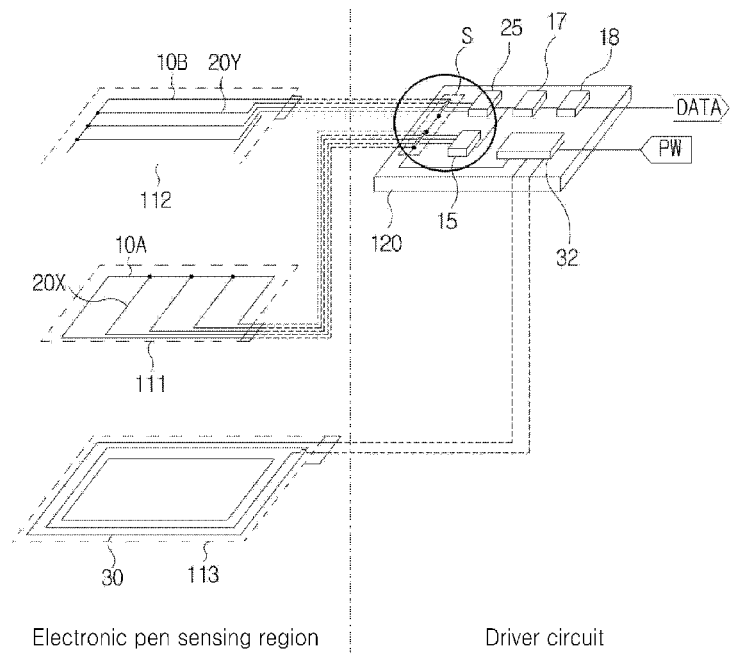
FIG. 5 shows schematically the configuration of the tablet according to the present invention.

FIG. 5 shows schematically a configuration of a tablet according to the invention, which implements an electronic pen sensing region with an improved structure.

Referring to FIG. 5, the electronic pen sensing region A is configured by using three circuit patterns, i.e., a first circuit pattern 111 comprising a pattern of X-axis line antennas 20X and a X-axis loop antenna 10A; a second circuit pattern 112 comprising a pattern of Y-axis line antennas 20Y and a Y-axis loop antenna 10B; and a third circuit pattern 113 of a power coil 30.

Meanwhile, each of the circuit patterns is preferable to comprise a transparent, conductive and flexible material and can be formed by applying material such as ITO to a certain substrate (for example, for a transparent member, glass, polymer(acrylic resin, PMMA, etc.) by using a pattern printing or a nano-imprinting technique or a gravure-offset technique, etc.

The respective circuit patterns 111, 112, and 113 are separately formed on the individual substrates and then the substrates having the respective circuit patterns are stacked one on another. Thereby an electronic pen sensing region which is capable of detecting X axis and Y axis coordinates relative to an approached or touched electronic pen can also be configured. Furthermore, an electronic pen sensing region can also be configured by forming a first circuit pattern 111 on one base substrate and thereon an insulating material is coated and then thereon further a second circuit pattern 112 is formed and then a further step follows in this way (see FIG. 7).

First, a structure of a first circuit pattern 111 having X-axis line antennas and Y-axis loop antenna will be described. A X-axis loop antenna 10A which is formed in this circuit pattern 111 does not constitute a complete loop and is open to the outside at one side of the first circuit pattern 111. In addition, each of line antennas 20X all has one end connected to the X-axis loop antenna 10A but line antennas extend in parallel with a pattern of the loop antenna 10A without the intersection with the loop antenna 10A and then take a shape of extending into the outside at the one side of the first circuit pattern 111.

If configured in this shape, it is possible to form such that a pattern of a loop antenna and a pattern of a plurality of line antennas are not intersected with each other within a first circuit pattern 111. Thereby, an antenna pattern of a first circuit pattern 111 can be manufactured in a simple manner where a conductive material is printed as a first layer.

Meanwhile, a loop shape of X-axis loop antenna 10A is completed through a combination with a control substrate 120. That is, at the control substrate is formed a conductive pattern 10E which is a remaining portion of a pattern for making a complete loop by closing the open portion of the X-axis loop antenna 10A (see FIG. 6).

Figure 6:
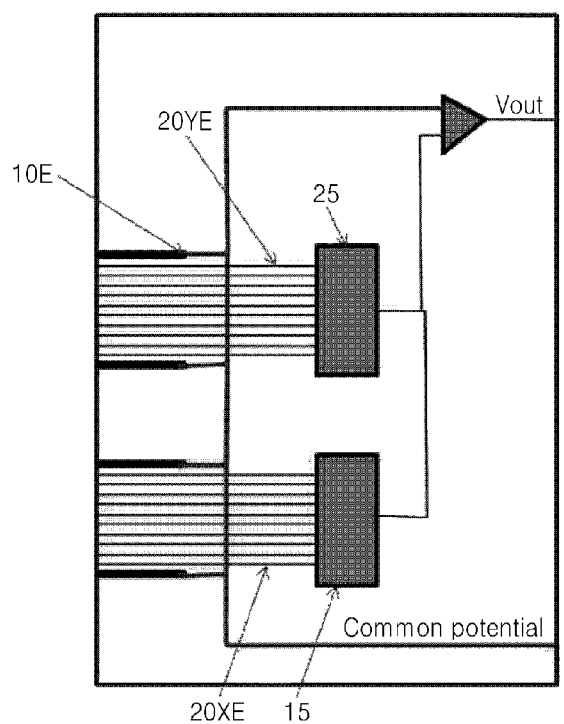
FIG. 6 is a enlarged view for explaining a method of forming a circuit pattern for use in a tablet according to the present invention.

Furthermore, the intersection and insulation between the X-axis loop antenna 10A and the X-axis line antennas 20X are realized in the conductive pattern portion of the control substrate 120. That is, the other end of X-axis line antennas 20X extends up to a first extension patterns 20XE and these extension patterns are arranged to intersect the conductive pattern 10E in an state where both are insulated from each other. The first extension patterns 20XE of X-axis line antennas which have intersected the conductive pattern 10E are connected to an input of a multiplexer installed in the control substrate 120. As shown in FIG. 6, the conductive pattern 10E (indicated in a red solid line) which is a portion of the loop antenna pattern is arranged to be insulated from the first extension patterns 20XE (indicated in a black solid line) which are a portion of the line antenna pattern.

A substrate on which a first circuit pattern 111 constituting an electronic pen sensing portion A is printed is preferable to be a antenna substrate 110 of a transparent and flexible material. However a control substrate 120 where multiplexers 15 and 25, an amplifier 17, MCU 18, etc. are installed can also be configured in a general hard PCB because by a hard PCB the insulation of a circuit pattern and the formation of a multi layered circuit pattern can be realized without difficulty.

In this way, an antenna structure according one embodiment of the present invention is completed when a first circuit pattern 111 and a control substrate 120 are combined.

The conductive pattern 10E of the X-axis loop antenna 10A becomes a common potential by connecting a circuit pattern (a red pattern) which has a common potential in the control substrate 120.

A second circuit pattern 112 where Y-axis line antennas 20Y and a Y-axis loop antenna 10B are formed can also be configured in a similar way to the first circuit pattern 111. That is to say, the Y-axis loop antenna 10B is configured to be open to the outside through one side of the second circuit pattern 112. The other ends of Y-axis line antennas 20Y extend in parallel with a pattern of Y-axis loop antenna 10B to the outside.

If the second circuit pattern 112 is combined with the control substrate 120, the open portion of the Y-axis loop antenna 10B of the second circuit pattern 112 is combined with a conductive pattern formed at the control substrate 120, thereby completing a loop antenna having a complete closed loop shape wherein the conductive pattern formed at the control substrate 120 can be integrated with a conductive pattern connected with the X-axis loop antenna, and thus can be configured to have the same potential as the conductive pattern connected with the X-axis loop antenna. In the control substrate 120, a plurality of Y-axis line antennas 20Y intersect with the conductive pattern 10E constituting the remaining portion of the Y-axis loop antenna 10B in an insulated state in an insulation portion S and are connected with inputs of the multiplexer 25.

Meanwhile, the power coil 30 is configured to enclose an external border of the electronic pen sensing region A and as a winding number and a wire size have to be controlled so as to output more energy relative to the electronic pen, the power coil is formed individually on a separate substrate with coils being not piled up or is configured by forming a pattern of the power coil 30 on a separate power coil control substrate (not shown) via a printing, etc., and then boring out an internal portion of the power coil 30 of a loop shape, i.e., a portion of the substrate corresponding to an electronic pen sensing region wherein the circuit patterns 111 and 112 constituting the electronic pen sensing region are arranged within the bored portion.

Both ends of such power coil 30 are connected to the power supply driver 32 which can be provided for the control substrate 120.

In the control substrate 120, as shown, the remaining portions of the line antennas and the loop antenna, i.e., a conductive pattern, a first extension pattern and a second extension pattern are arranged and these are insulated from each other, thus forming an insulation region S. In addition, multiplexers 15 and 25 for selecting any one of the other ends of the plurality of line antennas; the amplifier 17 to which an output of the multiplexers and a potential of the loop antenna, i.e., a common potential are connected; and the MCU 18 for producing the coordinates of the electronic pen P according to an output of the amplifier are configured in the scan substrate. Also, the power supply driver 32 for driving the power coil 30 by receiving power from the outside can also be arranged in the control substrate. The power supply driver 32 can also provide each of the loop antennas with a common potential.

This structure of the control substrate 120 is simply one example and a structure of the control substrate can also be implemented in various alternatives. In addition, the arrangement configuration and the number of constituting elements installed in the control substrate 120 can be set variously.

The first circuit pattern 111, the second circuit pattern 112 and the power coil 30 as configured above are stacked one on top of another, thereby forming one integrated substrate (not shown). Then if the integrated substrate is installed on a display surface of a display device, only two layers of the transparent electrode are piled up on the display surface of the display device and thereby a touch screen having an improved transparency can be manufactured.

That is to say, a portion which shields a display device by a transparent film is only the first circuit pattern 111 and the second circuit pattern 112 in the substrate. This is because the power coil 30 is formed separately without pile-up on an independent substrate and thus attached to a separate substrate or the first circuit pattern 111 and the second circuit pattern can be installed in the substrate 113 having a bored portion corresponding to as the electronic pen sensing region. In this integrated substrate an overlapping pattern in the inside of the loop antenna is only a portion where the X-axis line antennas 20X and the Y-axis line antennas 20Y are intersected. This is because the power coil 30 is formed in an external border of the electronic pen sensing region A not to overlap the line antennas or the loop antenna.

Of course, the integrated substrate can also be arranged at the back of the display device but as the electronic pen has to touch directly the integrated substrate so as to detect the position of the electronic pen P more accurately it is preferable to arrange the integrated substrate on a surface in front of the display.

Further, according to a tablet having an antenna pattern structure comprising the configuration as described above, at the time of fabricating a substrate where an electronic pen sensing region is formed, it is possible to configure the substrate in the manner of printing an antenna pattern on a surface of insulating material by a single layer. Therefore, the process is simple and a manufacture cost can be reduced.

Further, as the thickness of the substrate having the electronic pen sensing region can be thinner, flexibility of the substrate can be ensured.

Figure 7:
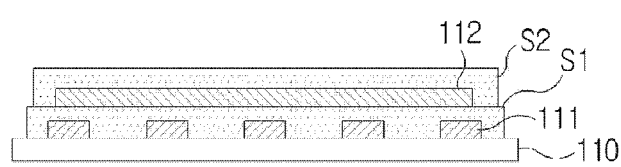
FIG. 7 is a drawing for explaining various methods for forming an antenna pattern on a transparent member, for use in the tablet according to the invention.
Figure 7:
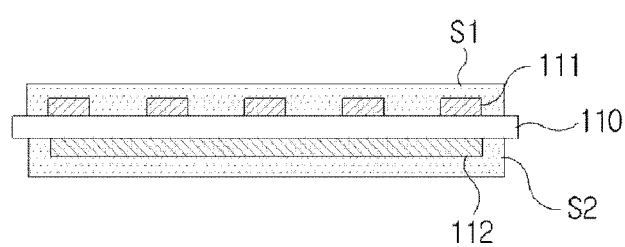
Figure 7:
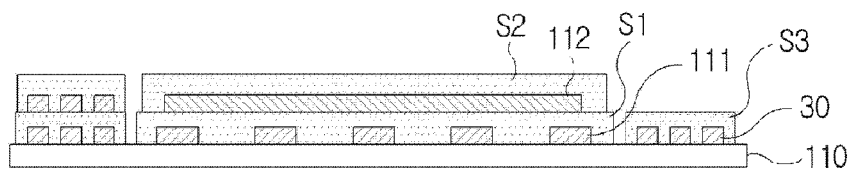

Next, referring to FIG. 7, various methods of forming an antenna pattern on a transparent member, in the tablet according to the present invention, will be described.

By using the antenna pattern described above according to the present invention, the respective circuit patterns 111 and 112 are formed on the same plane in a simple printing manner.

In FIG. 7(a), first, an X-axis antenna pattern 111 is formed on a antenna substrate 110 by a screen printing, etc., wherein the antenna substrate is a base substrate. Then the resulting X-axis antenna pattern 111 is coated with insulating material S1. Thereon a Y-axis antenna pattern 112 is formed by a screen printing, etc., and then the resulting pattern is again coated with insulating material S2. The structure having the electronic pen sensing region is formed as described above.

Meanwhile, FIG. 7(b) is a sectional view of the structure fabricated in another method. In the drawing an X-axis antenna pattern 111 and a Y-axis antenna pattern 112 are formed on both surfaces of a antenna substrate 110 which is a base substrate, respectively via a printing method, etc. Then the respective patterns are coated with insulating material S1 and S2.

In the structure illustrated in FIGS. 7(a) and 7(b) the structure of a power coil is not described. That is to say, it means that a power coil can be configured in a separate substrate and thus arranged on the circumference of the transparent member.

Next, in FIG. 7(c), for example, an electronic pen sensing region is configured as described in FIG. 7(a). Then, it is shown that a power coil can also be formed on the circumferential portion of a antenna substrate via a screen printing etc., wherein the circumferential portion of the antenna substrate is formed to enclose line antennas and a loop antenna. At this time, a multi-layered power coil 30 can also be formed by forming a layer of power coil pattern and then coating the power coil pattern with insulating material S3; and again forming another layer of power coil pattern.

Figure 8:
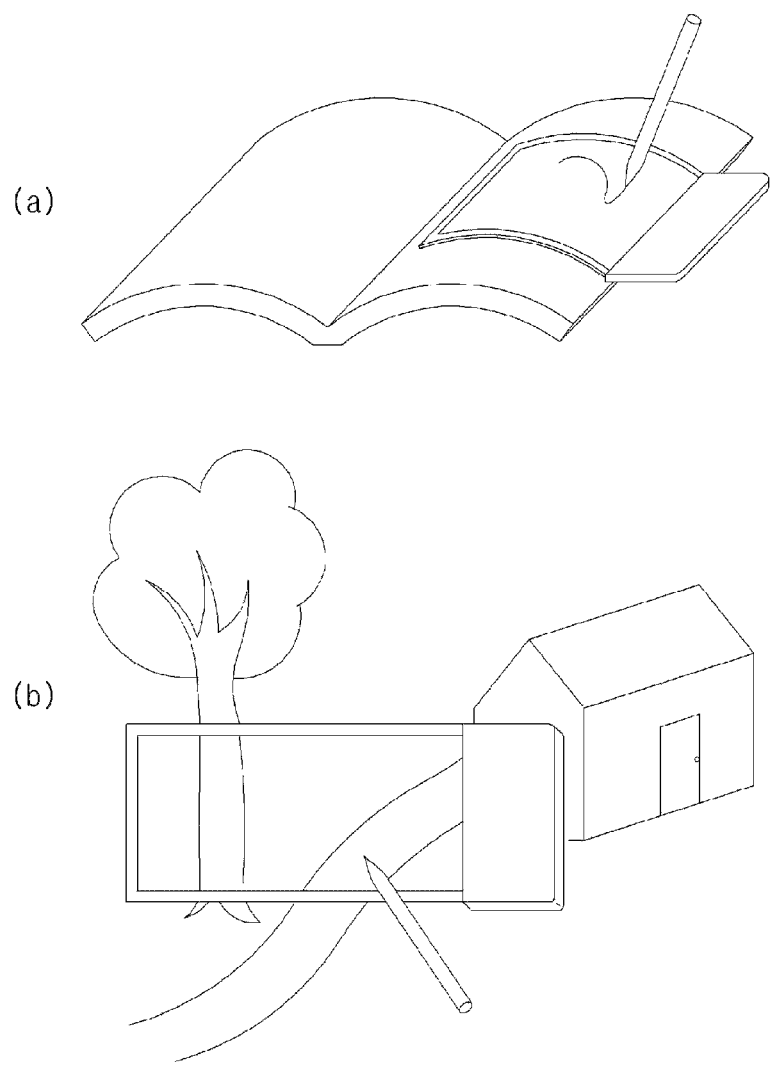
FIG. 8 shows usage examples of the tablet according to the present invention.

FIG. 8 shows one application of the tablet according to the present invention. in the tablet according to the present invention an electronic pen sensing region is configured by forming an antenna of transparent material on a transparent member. Therefore the electronic pen sensing region can be configured to be transparent, thus being capable of providing various availabilities.

As one example, as illustrated in FIG. 8(a) an application of tracking an underdrawing by using an electronic pen by putting an electronic pen sensing region on the curved face is possible. This is because the electronic pen sensing region comprises both transparent and flexible material.

In addition, as illustrated in FIG. 8(b), it is also possible to draw a landscape reflected in a transparent electronic pen sensing region as it is.

Such application of the tablet enables a child, a disabled person or an old person to draw along letters or pictures in the printed matter. Thus educational or medical effects can be anticipated.

The invention claimed is:

1. A tablet having a flexible and transparent sensing region, comprising:
    a antenna substrate of an insulating material including a first loop antenna of a conductive material pattern formed to enclose an external circumference of an electronic pen sensing region for detecting a position of the electronic pen; and a plurality of first line antennas of a conductive material pattern which are arranged in parallel with each other within an internal portion of the first loop antenna and ends of which are electrically connected to the first loop antenna; and
    a control substrate including a first multiplexer(MUX) which has the other ends of the plurality of first line antennas, as inputs, and is configured to select any one of the inputs according to a first selection signal, as an output; an amplifier which is configured to output a potential difference between an output of the first multiplexer and an output of the first loop antenna; and a MCU(micro controller unit) which is configured to generate the first selection signal in any manner to select at least one of the plurality of first line antennas and then detect a position of the electronic pen outputting a resonant voltage of a predetermined frequency, from any one of the first line antennas on the basis of the potential difference outputted from the amplifier when the electronic pen approaches closely the electronic pen sensing region.

2. The tablet having a flexible and transparent sensing region of claim 1, wherein the first loop antenna is formed of a transparent material,
    and the first loop antenna formed on the antenna substrate are combined with a first conductive pattern formed on the control substrate to form a closed loop, the other ends of the plurality of first line antennas are respectively connected to a plurality of first extension patterns which are insulated from and intersected with the first conductive pattern on the control substrate, and the plurality of first extension patterns are connected with the input of the first multiplexer.

3. The tablet having a flexible and transparent sensing region of claim 2, wherein a common potential is connected to the first conductive pattern formed on the control substrate.

4. The tablet having a flexible and transparent sensing region of claim 1, wherein the antenna substrate is formed of a transparent and flexible material.

5. The tablet having a flexible and transparent sensing region of claim 4, wherein the pattern of the first loop antenna and the pattern of the first line antenna on the antenna substrate are screen-printed by a transparent, conductive and flexible material.

6. The tablet having a flexible and transparent sensing region of claim 2, wherein;
    the antenna substrate further comprises:
    a first transparent protective layer for insulating the pattern of the first loop antenna from the pattern of the plurality of first line antennas;
    a second loop antenna of a transparent and conductive material which is formed on the transparent protective layer and configured with an open one end thereof formed to enclose an external circumference of the electronic pen sensing region;
    and a plurality of second line antennas of a transparent and conductive material pattern which are arranged in parallel with each other within an internal portion of the second loop antenna and ends of which are connected to the second loop antenna;
    the control substrate further comprising:
    a second conductive pattern which combines the pattern of the second loop antenna formed on the antenna substrate to form a closed loop;
    a plurality of second extension pattern which are connected to each of the second line antennas formed on the antenna substrate and are intersected with and insulated from the second conductive pattern; and
    a second multiplexer which has as inputs, the plurality of extension patterns and is configured to select as an output any one of the inputs according to a second selection signal and connect the selected output to the amplifier,
    wherein the MCU further generates a second selection signal for selecting any one of the plurality of second line antennas and further detects a position of the electronic pen from any one of the second line antennas on the basis of a potential difference outputted from the amplifier.

7. The tablet having a flexible and transparent sensing region of claim 1, further comprising a pattern of a power coil on the antenna substrate for enclosing the electronic pen sensing region.

8. The tablet having a flexible and transparent sensing region of claim 7, further comprising a power supply driver for supplying the power coil with an alternate current voltage via a resonant frequency of the electronic pen.

9. The tablet having a flexible and transparent sensing region of claim 1, further comprising a power coil control substrate which is formed of a flexible material and in which a pattern of a power coil is formed to enclose the electronic pen sensing region.

10. The tablet having a flexible and transparent sensing region of claim 9, further comprising a power supply driver for supplying the power coil with an alternate current voltage via a resonant frequency of the electronic pen.

* * * * *